(12) United States Patent
Ogawa

(10) Patent No.: US 7,940,313 B2
(45) Date of Patent: May 10, 2011

(54) DIGITAL CAMERA INCLUDING A RECORDING MEDIUM DETECTOR AND WARNING UNIT

(75) Inventor: Hidehiro Ogawa, Funabashi (JP)

(73) Assignee: Nikon Corporation, Tokyo (JP)

( * ) Notice: Subject to any disclaimer, the term of this patent is extended or adjusted under 35 U.S.C. 154(b) by 533 days.

(21) Appl. No.: 12/000,765

(22) Filed: Dec. 17, 2007

(65) Prior Publication Data

US 2008/0151094 A1 Jun. 26, 2008

(30) Foreign Application Priority Data

Dec. 22, 2006 (JP) .................................. 2006-345980
Nov. 28, 2007 (JP) .................................. 2007-307383

(51) Int. Cl.
*H04N 5/76* (2006.01)
*H04N 5/222* (2006.01)

(52) U.S. Cl. ................................ 348/231.7; 348/333.04

(58) Field of Classification Search ............. 348/231.99, 348/231.1, 231.7–231.9, 333.01, 333.02, 348/333.04
See application file for complete search history.

(56) References Cited

U.S. PATENT DOCUMENTS

| | | | | |
|---|---|---|---|---|
| 5,986,700 | A * | 11/1999 | Wakui | 348/231.8 |
| 6,661,454 | B1 * | 12/2003 | Hwang et al. | 348/231.1 |
| 6,927,794 | B2 * | 8/2005 | Kubo et al. | 348/231.8 |
| 7,106,375 | B2 * | 9/2006 | Venturino et al. | 348/333.02 |
| 7,236,193 | B2 * | 6/2007 | Suemoto et al. | 348/231.8 |
| 7,675,558 | B2 * | 3/2010 | Shimizu | 348/231.99 |
| 2005/0046709 | A1 * | 3/2005 | Nagai | 348/231.8 |
| 2005/0174446 | A1 * | 8/2005 | Hitosuga | 348/231.8 |
| 2006/0018207 | A1 * | 1/2006 | Saito | 369/30.01 |

OTHER PUBLICATIONS

Nikon Corporation, "Digital Single-Lens Reflex Camera D2Xs Catalogue," p. 6 (Jun. 1, 2006).

* cited by examiner

*Primary Examiner* — Timothy J Henn
(74) *Attorney, Agent, or Firm* — Oliff & Berridge, PLC

(57) ABSTRACT

A camera includes an image-capturing unit that captures an image of a subject; a generating unit that generates an image data based on the captured image; a loading unit capable of loading a recording medium for recording the image data generated by the generating unit; a recording control unit that records the generated image data in the recording medium loaded in the loading unit; a detection unit that detects a state of loading of the recording medium in the loading unit; and a display control unit that displays an icon that indicates the state of loading of the recording medium and information on the recording medium in association with the icon on a display device. In an embodiment, the loading unit includes a plurality of recording media.

18 Claims, 6 Drawing Sheets

FIG.3

```
          PHOTOGRAPHING MENU

IMAGE QUALITY MODE
          RAW+FINE
          RAW+NORMAL
          RAW+BASIC
          RAW
          FINE
          NORMAL
          BASIC
```

DIGITAL CAMERA INCLUDING A RECORDING MEDIUM DETECTOR AND WARNING UNIT

INCORPORATION BY REFERENCE

The disclosure of the following priority applications are herein incorporated by reference:

Japanese Patent Application No. 2006-345980 (filed Dec. 22, 2006), and

Japanese Patent Application No. 2007-307383 (filed Nov. 28, 2007.

BACKGROUND OF THE INVENTION

1. Field of the Invention

The present invention relates to a camera that captures an image.

2. Description of Related Art

A conventional camera that displays a mark indicating loading of a memory card therein on a monitor is known from, for example, NIKON CORPORATION, "Digital Single-Lens Reflex Camera D2Xs Catalogue, Jun. 1, 2006, page 6, upper left figure.

SUMMARY OF THE INVENTION

However, since the conventional camera merely displays the mark indicating whether or not a memory card is loaded in the digital camera, a user can not easily grasp or understand information relating to recording image data into the card when he or she sees the mark.

The digital camera according to a first aspect of the present invention includes an image capturing unit that captures an image of a subject; a generating unit that generates an image data based on the captured image; a loading unit capable of loading a recording medium for recording the image data generated by the generating unit; a recording control unit that records the generated image data in the recording medium loaded in the loading unit; a detection unit that detects a state of loading of the recording medium in the loading unit; and a display control unit that displays an icon that indicates the state of loading of the recording medium and information on the recording medium in association with the icon on a display device.

According to a second aspect of the present invention, the display control unit in the digital camera according to the first aspect preferably displays the information on the recording medium in or near the icon.

According to a third aspect of the present invention, the information on the recording medium in the camera according to the first aspect preferably includes information on an image quality of the image when the image data is generated.

According to a fourth aspect of the present invention, the loading unit in the digital camera according to the first aspect preferably is provided with a plurality of slots each capable of loading a plurality of recording media and the detection unit may detect the state of loading of the recording medium for each of the plurality of slots; and the display control unit displays the detected state of loading of the recording medium for each of the plurality of slots with the icon.

According to a fifth aspect of the present invention, it is preferred in the camera according to the fourth aspect that when displaying the icons for the plurality of recording media, the display control unit displays, between the plurality of the icons, information indicating a relationship on recording between the plurality of recording media.

According to a sixth aspect of the present invention, the camera according to the fifth aspect preferably includes a warning unit that gives a warning to a user, if the detection unit detects that out of the plurality of recording media, a recording medium that is supposed to be loaded has not been loaded by the loading-unit based on the relationship on recording between the plurality of recording media.

According to a seventh aspect of the present invention, it is preferred that in the camera according to the fifth aspect, if the detection unit detects that out of the plurality of recording media, a recording medium that is supposed to be loaded has not been loaded by the loading unit based on the relationship on recording between the plurality of recording media, an image data of an image to be recorded in the recording medium that has not been loaded is recorded in a recording medium that is loaded by the loading unit.

According to an eighth aspect of the present invention, it is preferred that in the camera according to the fourth aspect, the recording control unit determines which of the plurality of recording media the image data is to be recorded based on a total recording capacity or a remaining recording capacity of each of the plurality of recording media.

The camera according to a ninth aspect of the present invention includes an image capturing unit that captures an image of a subject; a generating unit that generates an image data based on the captured image; a loading unit capable of loading a plurality of recording media that record image data generated from the image captured by the image capturing unit; a recording control unit that records the generated image data in the plurality of recording media while the recording medium is being loaded in the loading unit; a detection unit that detects respective states of loading of the plurality of recording media in the loading unit; and a display control unit that displays, on a display device, icons indicating the respective states of loading of the plurality of recording media and also displays, between the icons, information indicating a relationship on recording between the plurality of recording media.

According to a tenth aspect of the present invention, it is preferred that in the camera according to the fourth aspect, the relationship on recording between the plurality of recording media is a relationship on any one of the following recording modes (a) to (c) that are preset upon photographing: (a) a sequential recording mode in which when it becomes impossible to record the image data in one of at least two recording media, the image data is recorded in another of the at least two recording media; (b) a backup recording mode in which the image data is recorded in each of the at least two recording media; and (c) a divisional recording mode in which at least two image data are generated by at least two image processing methods that are different from each other and the image data generated by one of the image processing methods is recorded in one recording medium and another of the image processing methods is recorded in another recording medium.

According to an eleventh aspect of the present invention, it is preferred that in the camera according to the tenth aspect, when the sequential recording mode is selected, the display control unit displays, between the plurality of icons, an arrow extending from one icon out of the icons that represents a recording medium in which the image data is first recorded to another icon that represents a recording medium in which the image data is recorded next while when one of the backup recording mode and the divisional recording mode is selected, the display control unit displays between the plurality of icons a mark that indicates that the image data generated from the same image are recorded in the at least two recording media, respectively.

According to a twelfth aspect of the present invention, the camera according to the tenth aspect preferably includes an annunciation unit that gives an annunciation to a user such that when any one of the sequential recording mode, the backup recording mode, and the divisional recording mode is selected, if it is detected that only one of the recording media is loaded in the loading unit, the annunciation unit informs the user of shortage of a recording medium or recording media.

According to a thirteenth aspect of the present invention, it is preferred that in the camera according to the tenth aspect, when any one of the sequential recording mode, the backup recording mode, and the divisional recording mode is selected, and if it is detected that only one of the recording media is loaded in the loading unit, a plurality of image data corresponding to image signals obtained upon capturing the image in any one of the backup recording mode and the divisional recording mode are recorded in the only one of the recording media.

According to a fourteenth aspect of the present invention, the camera according to the tenth aspect preferably includes a judgment unit that judges which one of the backup recording mode and the divisional recording mode is selected; and a calculation unit that calculates remaining capacities of the at least two recording media, respectively. In this case, when the judgment unit judges that any one of the backup recording mode and the divisional recording mode is selected, the recording control unit records an image data having a larger amount of data in a recording medium having a larger remaining capacity calculated by the calculation unit.

According to a fifteenth aspect of the present invention, the camera according to the tenth aspect preferably includes a decision unit that decides which one of the at least two image data is to be recorded in which one of the at least two recording media. In this case, when setting of the recording mode is changed or when the recording mode is reset to the divisional recording mode, the decision unit decides again which one of the at least two image data is to be recorded in which one of the at least two recording media.

According to a sixteenth aspect of the present invention, the camera according to the tenth aspect preferably includes an exchange detection unit that detects an exchange of the recording media, a decision unit that decides which one of the at least two image data is to be recorded in which one of the at least two recording media. In this case, the decision unit decides again which one of the at least two image data is to be recorded in which one of the at least two recording media based on a remaining capacity of the recording medium after the exchange detected by the exchange unit.

According to a seventeenth aspect of the present invention, the camera according to the tenth aspect preferably includes a decision unit that decides which one of the at least two image data is to be recorded in which one of the at least two recording media; a calculation unit that calculates remaining capacities of the at least two recording media, respectively; and a recording judgment unit that judges whether it is impossible to record the image data in any one of the at least two recording media in a set recording mode based on the remaining capacity calculated by the calculation unit due to a decrease in the remaining capacity of the recording medium concerned. In this case, the decision unit decides again which one of the at least two image data is to be recorded in which one of the at least two recording media based on the remaining capacity of the recording medium calculated by the calculation unit at a time in point when the recording judgment unit performs the judgment.

According to an eighteenth aspect of the present invention, it is preferred that in the camera according to the second aspect, the information on the recording medium is information on any one of (a) recording of data in a RWA format, (b) recording of data compressed in a JPEG format, and (c) either one of recording of data in a RWA format and recording of data compressed in a JPEG format, each preset upon photographing.

According to an nineteenth aspect of the present invention, it is preferred that in the camera according to the third aspect, the image quality of the image is any one of (a) recording of data in a RWA format, (b) recording of data compressed in a JPEG format, and (c) either one of recording of data in a RWA format and recording of data compressed in a JPEG format, each preset upon photographing.

BRIEF DESCRIPTION OF THE DRAWINGS

FIG. 3 is a diagram illustrating a specific example of an image quality mode selection screen;

DETAILED DESCRIPTION OF THE INVENTION

Figure 1:
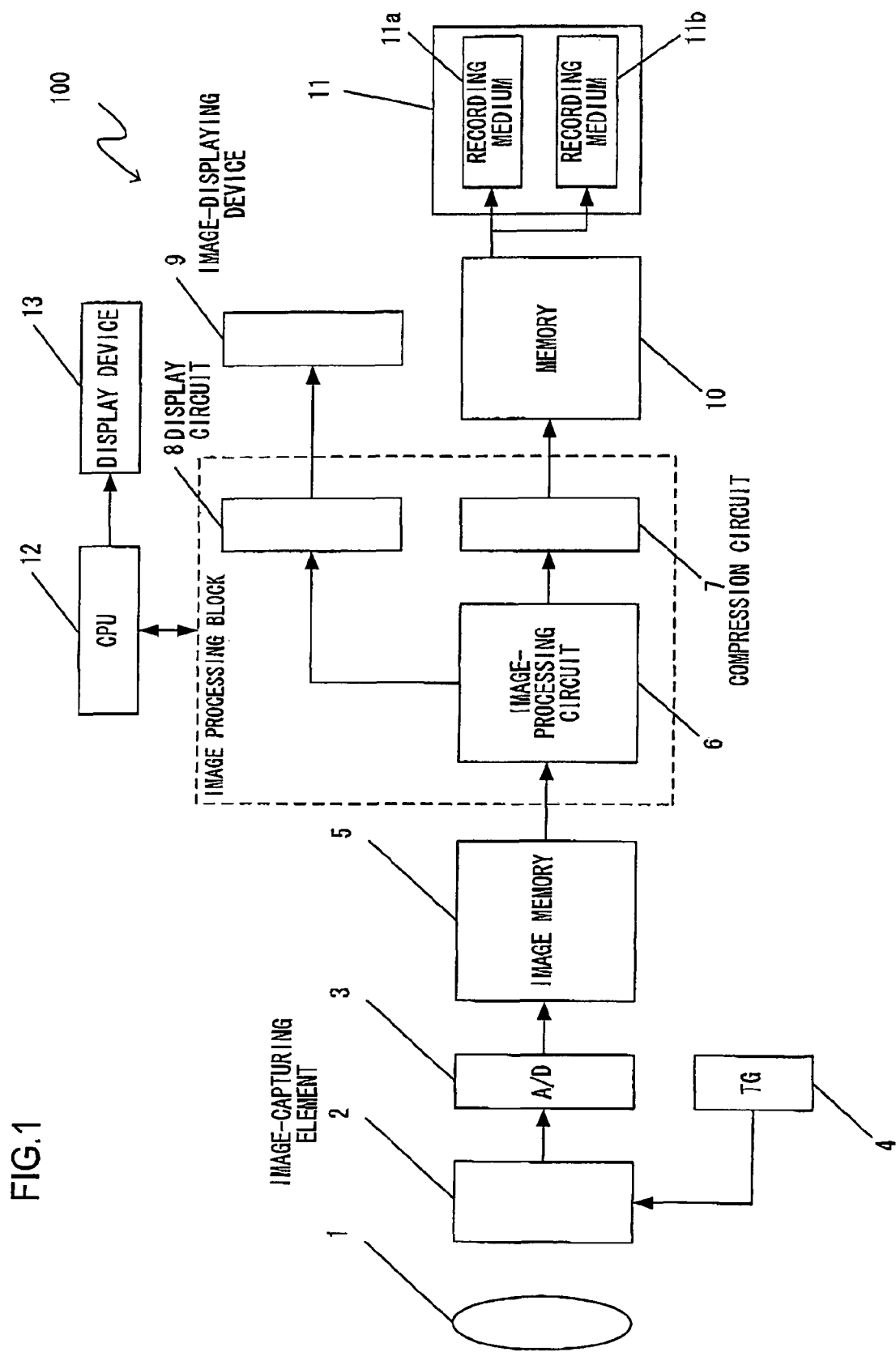
FIG. 1 is a block diagram illustrating a configuration of a digital camera according to a first embodiment of the present invention.

FIG. 1 is a block diagram illustrating a configuration of a camera according to one embodiment of the present invention. A camera 100, for example, a digital single-lens reflex camera includes a photographic lens 1, an image-capturing element 2, an A/D conversion circuit (A/D) 3, a timing generator (TG) 4, an image memory 5, an image processing circuit, a compression circuit 7, a display circuit 8, an image display device 9, a memory 10, a recording medium loading unit 11, a CPU 12, and a display device 13.

The photographic lens 1 is configured to be detachably attached to a body of the camera 100 through a lens mount unit that is not shown. Note that although the photographic lens 1 in actuality is composed of a plurality of optical lenses as a group, a single lens represents the group of lenses in FIG. 1. The image-capturing element 2 captures an image of a subject by converting the image of the subject formed by the photographic lens 1 into an electric signal. On this occasion, the image-capturing element 2 captures the image of the subject when a timing signal is provided by the timing generator 4. The A/D conversion circuit 3 converts an analog signal (analog image signal) that is input from the image-capturing element 2 into a digital signal (digital image signal).

The image memory 5 is a memory that temporarily records an image data, i.e., digital image signal output from the A/D conversion circuit 3. The image processing circuit 6 reads out the image data recorded in the image memory 5 and executes various types of image processing thereon. The compression circuit 7 is an image processing circuit that compresses the image data after having undergone the image processing by the image processing circuit 6 in a predetermined compression format, for example, JPEG and temporarily records the compressed image data in the memory 10. The image data recorded in the memory 10 is output to the recording medium loading unit 11.

In the camera 100 according to the present embodiment, the recording medium loading unit 11 is provided with two slots so that two recording media for recording image data, for example, memory cards 2 can be loaded. Thus, the image data input from the memory 10 can be recorded in two recording media, that is, recording media 11a and 11b, respectively, that are releasably loaded (inserted) in the recording medium loading unit 11. The recording of the image data in the recording media 11a and 11b is controlled by the CPU 12 detailed hereinbelow.

Note that the two slots provided in the recording medium loading unit 11 may be adapted to allow loading of two memory cards of the same standard or specification or of two memory cards of different standards or specifications. For example, each slot may be adapted to load an SD card. It may be also acceptable that one is for loading a secure digital card (SD card) and the other is for loading a compact flash card.

The display circuit 8 outputs data for display, such as the image data after having undergone the image processing by the image processing circuit and various types of setting menu screens as output data to the image-displaying device 9. The image-displaying device 9 is, for example, a thin-film transistor (TFT) type monitor mounted on the rear surface of a camera (rear surface monitor) and displays the output data output from the display circuit 8. The CPU 12 controls each element or unit which the camera 100 is provided with to control the camera 100 in whole. The display device 13 is a display device provided separately from the image-displaying device 9, for example, a liquid crystal display device arranged on the upper surface of the camera 100 used for indicating the state of the camera 100.

Figure 2:
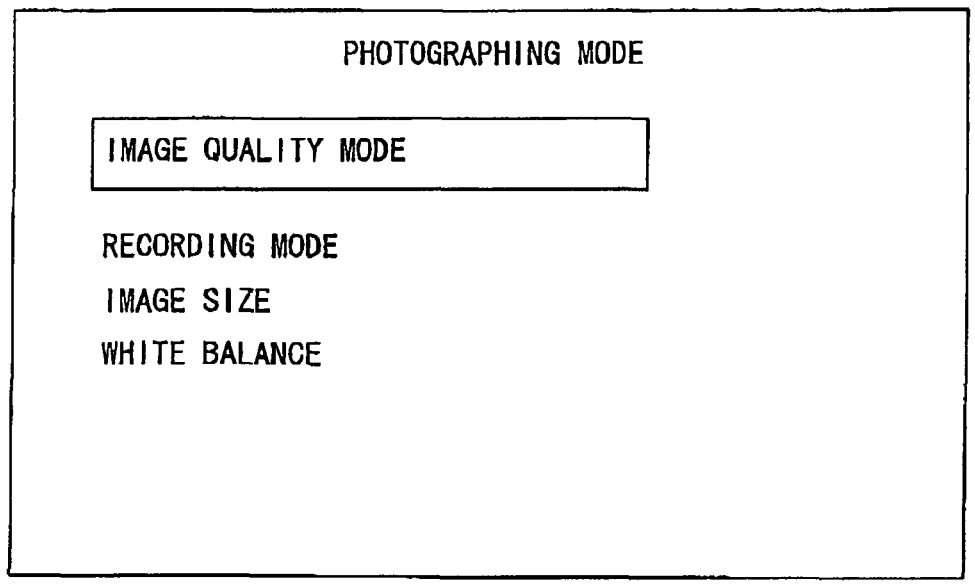
FIG. 2 is a diagram illustrating a specific example of a photographing menu screen.

As mentioned above, the camera 100 according to the present embodiment can record image data in the two recording media 11a and 11b, respectively. A user can operate an operation member not shown in the drawings to display a setting menu on the image-displaying device 9 and set the image quality of an image to be recorded in each recording medium and a method of recording the image data in the recording medium on setting menu. For example, the user can select an "image quality mode" on the photographing menu screen as shown in FIG. 2 to set the image quality of the image corresponding to the image data to be recorded in each of the recording media 11a and 11b. Also, the user can select a "recording mode" on the photographing menu screen as shown in FIG. 2 to set the method of recording the image data in each of the recording media 11a and 11b.

When the user selects "image quality mode" on the photographing menu as shown in FIG. 2, the CPU 12 displays an image quality mode selection screen, which is a screen for selecting the image quality of an image, as shown in FIG. 3 on the image-displaying device 9. The user sets on the screen the image quality of an image corresponding to an image data to be recorded. In the present embodiment, the selection of an image data recording format and an image compression ratio are selected to set image quality. That is, the user selects any one of RAW and JPEG as the recording format, and if JPEG is selected, the user further selects the compression ratio of the image to set the image quality thereof.

In the preferred embodiment, the compression ratio of an image can be set by selecting any one of setting values, "FINE", "NORMAL", and "BASIC", representing degrees of the compression ratio, respectively. "FINE" is a setting value for acquiring an image having the lowest compression ratio and a high image quality, and "NORMAL" is a setting value for acquiring an image having a lowest compression ratio next to that of "FINE" and a high image quality. "BASIC" is a setting value for acquiring an image having a lower image quality than "FINE" and "NORMAL" and having the highest compression ratio. From the above, in the present embodiment, the image quality of an image to be recorded is selected from RAW, FINE of JPEG (or simply referred to as FINE), NORMAL of JPEG (or simply referred to as NORMAL), and BASIC of JPEG (simply referred to as BASIC).

For example, when the user selects RAW+FINE on the image quality mode selection screen as shown in FIG. 3, a single frame of image can be recorded in both image qualities of RAW and of FINE of JPEG. Further, selection of RAW+NORMAL allows one to designate a frame of image be recorded in both image qualities of RAW and of NORMAL of JPEG. Also, selection of RAW+BASIC allows one to designate a frame of image be recorded in both image qualities of RAW and of BASIC of JPEG. Alternatively, selection of any one of RAW, FINE, NORMAL, and BASIC enables one to record an image in any selected image quality.

Figure 4:
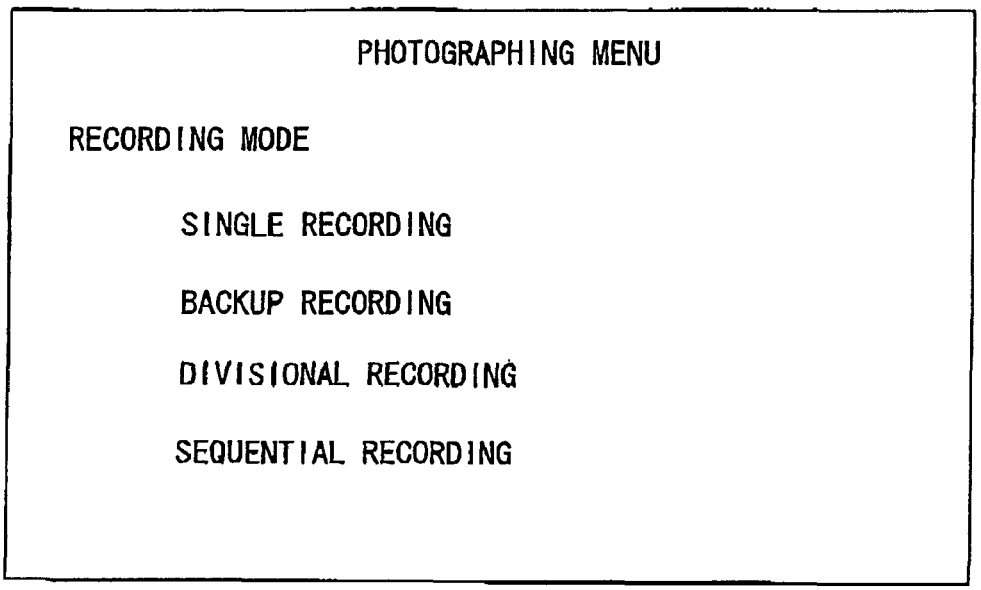
FIG. 4 is a diagram illustrating a specific example of a recording mode selection screen.

When the user selects "RECORDING MODE" on the photographing menu screen as shown in FIG. 2, the CPU 12 displays a recording mode selection screen as shown in FIG. 4 on the image-displaying device 9. When the user selects one of the recording modes of an image from "SINGLE RECORDING", "BACKUP RECORDING", "DIVISIONAL RECORDING", and "SEQUENTIAL RECORDING" on the screen, the method of recording of the image into the recording media 11a and 11b can be set. Hereinafter, each recording mode is explained.

"SINGLE RECORDING" is a mode for recording an image data in only one of the two recording media 11a and 11b. When the user selects "SINGLE RECORDING" as the recording mode, the CPU 12 records an image data in only a predetermined recording medium out of the recording media 11a and 11b. Also, if only either one of the recording media 11a and 11b is loaded in the recording medium loading unit 11, an image data is recorded in the loaded recording medium. On this occasion, if the mode of recording both an image data of a RAW format (RAW image data) and an image data of a JPEG format (JPEG image data), that is, any one of RAW+FINE, RAW+NORMAL, and RAW+BASIC is set as the above-mentioned image quality mode, both RAW and JPEG image data are recorded in the loaded recording medium.

"BACKUP RECORDING" is a mode for recording the same image data in both the two recording media 11a and 11b. When the user selects "BACKUP RECORDING" as the recording mode, the CPU 12 records the same image data in each of the recording media 11a and 11b, respectively. This enables a backup of an image to be automatically taken. Also, in the case of the "BACKUP RECORDING" mode, if the mode of recording each of the RAW image data and the JPEG image data is set as the image quality mode, both the RAW and JPEG image data will be recorded in each recording medium.

"DIVISIONAL RECORDING" is a mode for recording a RAW image data in one of the recording media 11a and 11b, and a JPEG image data in the other of the recording media 11a and 11b. Therefore, "DIVISIONAL RECORDING" is a mode that is enabled only when a mode for recording both the RAW image data and JPEG image data, that is, any one of modes RWA+FINE, RAW+NORMAL, and RAW+BASIC is set as the above-mentioned image quality mode.

"SEQUENTIAL RECORDING" is a mode in which an image data is first recorded in either one of the recording media 11a and 11b until its remaining capacity for recording reaches zero and then the image data is recorded in another recording medium. Also, in the "SEQUENTIAL RECORDING" mode, if the mode for recording each of the RAW image data and the JPEG image data is set as the image quality mode, both the image data will be recorded in one and the same recording medium.

In the camera 100 according to the present embodiment, the image data recorded in the two recording media 11a and 11b may differ in image quality or recording method of image data one from another. For this reason, the user can not grasp the state of recording an image data in each recording medium unless the image quality and recording method of the image data to be recorded in each recording medium are presented to the user. Accordingly, in the present embodiment, the CPU 12 displays the contents of the set image quality mode and the set recording mode in a display format that can be easily grasped by the user on the display device 13.

Figure 5A:
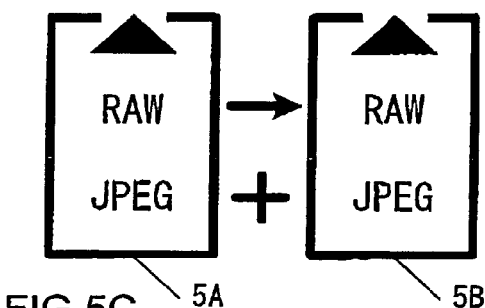
FIGS. 5A to 5G are each a diagram showing an example of display of an icon, a letter, and a symbol depending on an image quality mode and a recording mode.

In concrete terms, as shown in FIG. 5A, the CPU 12 displays icons in accordance with the respective recording media, that is, an icon 5a that stands for the recording medium 11a and an icon 5b that stands for the recording medium 11b on the display device 13. Note that the icons 5a and 5b are constituted by figures that stand for memory cards stipulated by CIPA (Camera & Imaging Products Association) standards and indicate the states of loading of recording media in the recording medium loading unit 11. The relationship between positions in which the icons 5a and 5b are displayed correspond to the relationship between positions of the slots of the recording medium loading unit 11 in which the recording media are loaded.

For example, when the recording medium loading unit 11 is provided with two slots, i.e., a slot No. 1 and a slot No. 2, the icon corresponding to the recording medium to be loaded in the slot No. 1 is displayed on the left hand side and the icon corresponding to the recording medium to be loaded into the slot No. 2 is displayed on the right hand side. In the case of a conventional camera, the state of loading of recording media in respective slots is presented to the user by switching displaying and non-displaying of icons. That is, when a memory card is loaded in each slot, the corresponding icon is displayed and when the memory card is not loaded, the corresponding icon is not displayed.

In the present embodiment, as shown in FIG. 5A, displaying and non-displaying of icons are switched in a conventional manner present the state of loading of the recording media in the recording medium loading unit 11 and further, information on the recording medium that is loaded in the recording medium loading unit 11 is displayed in association with the icons. In concrete terms, by displaying a letter or letters, a symbol or symbols, or a figure or figures in or near the icons standing for the recording media, the image quality mode or the recording mode that is set is presented to the user.

For example, in each of the icons 5a and 5b, letters or a word (RAW, JPEG) representing the image quality of an image to be recorded in the recording medium are displayed. The letters "RAW" and "JPEG" represent information on recording of images into recording media. In addition, in a space between the icons 5a and 5b (between icons), figures (→, +) representing recording mode of the image are displayed. Each of the symbols "→" and "+" represents information that represents a relationship between a plurality of recording media in association with recording.

As mentioned above, "RAW" and "JPEG" to be displayed in each icon indicates the format in which an image is to be recorded in each recording medium. For example, in the case where "JPEG" is displayed in the icon 5a, the image to be recorded in the recording medium 11a is constituted by JPEG image data. Note that although, in this case, the image quality of the image is presented to the user by displaying only the image format in the icon, when the image format is JPEG, the letters "FINE", "NORMAL", or "BASIC" representing the above-mentioned compression ratio may be displayed together. The CPU 12 determines which of "RAW" and "JPEG" to display in each icon based on the image quality mode and the recording mode set by the user.

The symbol "→" displayed between icons is a symbol that is displayed when "SEQUENTIAL RECORDING" is selected as the image recording mode. For example, in the case where a setting is made such that recording of an image into the recording medium 11a is being continued until the remaining capacity for recording of the recording medium 11a reaches zero and then the recording of image data in the recording medium 11b is started, an arrow "→" is displayed as directed in the direction of from the icon 5a to the icon 5b. On the other hand, the symbol "+" displayed between icons is a symbol that is displayed when "DIVISIONAL RECORDING" or "BACKUP RECORDING" is selected as the image recording mode. For example, in the case where the "DIVISIONAL RECORDING" mode is selected and a setting is made such that a RAW image data is recorded in the recording medium 11a and a JPEG image data is recorded in the recording medium 11b, "+" is displayed between the icon 5a in which "RAW" is displayed and the icon 5b in which "JPEG" is displayed.

Hereinafter, examples of display of icons, letters, and symbols in each image quality mode and in each recording mode are shown in FIGS. 5B to 5G. Note that in each of FIGS. 5B to 5G, the icons, letters, and symbols displayed on the display device 13 are expressed in a deep color and the icons, letters, and symbols that are not displayed on the display device 13 are expressed in a light color.

Figure 5B:
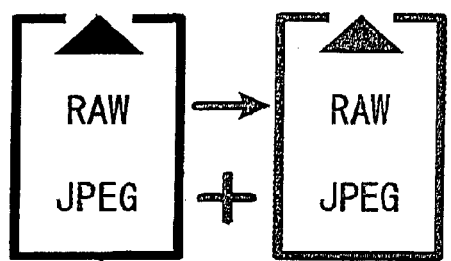

FIG. 5B, shows an example of display in the case where only the recording medium 11a is loaded in the recording medium loading unit 11 when "RAW" is selected as the image quality mode and "SINGLE MODE" is selected as the recording mode. In this case, in order to show that only the recording medium 11a is loaded and the recording medium 11b is not loaded in the recording medium loading unit 11, the CPU 12 displays only the icon 5a. Then, in order to show that a RAW image is to be recorded in the recording medium 11a, "RAW" is displayed in the icon 5a.

Figure 5C:
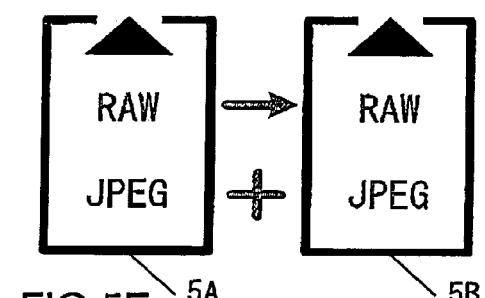

FIG. 5C shows an example of display in the case where both the recording media 11a and 11b are loaded in the recording medium loading unit 11 and when "FINE" is selected as the image quality mode and "SINGLE RECORDING" is selected as the image recording mode. In this case, in order to show that both the recording media 11a and 11b are loaded, the CPU 12 displays the icons 5a and 5b. Then, when "SINGLE RECORDING" is selected, in order to show that a JPEG image is recorded in the recording medium 11a only but no image is recorded in the recording medium 11b, "JPEG" is displayed in the icon 5a. Note that a similar display is made when "NORMAL" or "BASIC" is selected as the image quality mode.

Figure 5D:
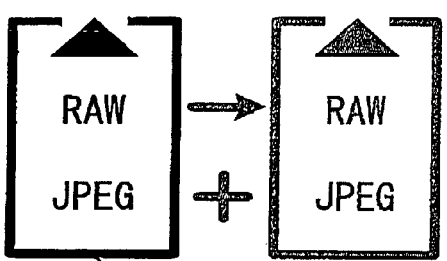

FIG. 5D shows an example of display in the case where only the recording medium 11a is loaded in the recording medium loading unit 11 when "RAW+FINE" is selected as the image quality mode and "SINGLE RECORDING" is selected as the image recording mode. In this case, the CPU 12 displays only the icon 5a with "RAW" and "JPEG" appeared therein, and an indication is made that a RAW image data and a JPEG image data can be recorded in the recording medium 11a, the CPU 12 displays "RAW" and "JPEG". Note that a similar display is made when "RAW+NORMAL" or "RAW+BASIC" is selected as the image quality mode.

Figure 5E:
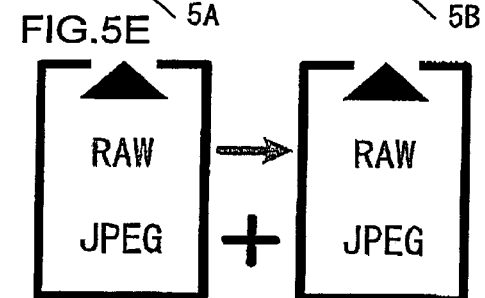

FIG. 5E shows an example of display in the case where both the recording media 11a and 11b are loaded in the recording medium loading unit 11 when "FINE" is selected as the image quality mode and "BACKUP RECORDING" is selected as the image recording mode. In this case, the CPU 12 displays the icons 5a and 5b. Then, in order to show that a JPEG image data is recorded in each of the recording media 11a and 11b, the CPU 12 displays "JPEG" in each of the icons 5a and 5b. On the other hand, in order to show that "BACKUP RECORDING" is selected as the recording mode, the CPU 12 displays "+" between the icons 5a and 5b. Note that a similar display is made when "NORMAL" or "BASIC" is selected as the image quality mode.

Figure 5F:
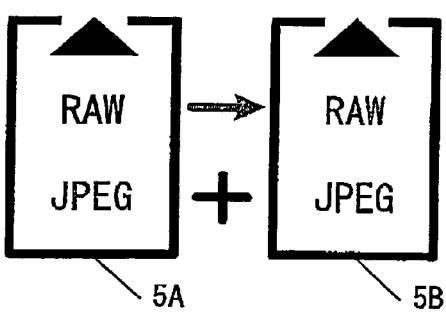

FIG. 5F shows an example of display in which each of the recording media 11a and 11b is loaded in the recording medium loading unit 11 when "RAW+FINE" is selected as the image quality mode and "DIVISIONAL RECORDING" is selected as the image recording mode. In this case, the CPU 12 displays the icons 5a and 5b. Then, in order to show that a RAW image data is recorded in the recording medium 11a and a JPEG image data is recorded in the recording medium 11b, the CPU 12 displays "RAW" in the icon 5a and "JPEG" in the icon 5b. On the other hand, in order to show that "DIVISIONAL RECORDING" is selected as the recording mode, the CPU 12 displays "+" between the icons 5a and 5b. Note that a similar display is displayed when "RAW+NORMAL" or "RAW+BASIC" is selected as the image quality mode.

Figure 5G:
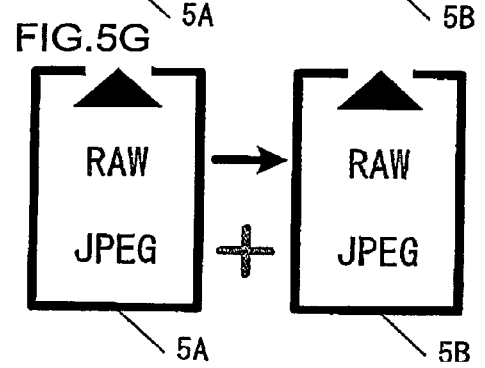

FIG. 5G shows an example of display in which both the recording media 11a and 11b are loaded in the recording medium loading unit 11 when "FINE" is selected as the image quality mode and "SINGLE RECORDING" is selected as the image recording mode. In this case, the CPU 12 displays the icons 5a and 5b. Then, in order to show that a JPEG image data is recorded in each of the recording media 11a and 11b, "JPEG" is displayed in each of the icons 5a and 5b. On the other hand, in order to show that "SEQUENTIAL RECORDING" is selected as the recording mode, "→" is displayed between the icons 5a and 5b. Note that a similar display is made when "NORMAL" or "BASIC" is selected as the image quality mode.

Note that while explanation has been made on the examples in which displaying and non-displaying of the icons, letters, and symbols are switched in accordance with the set image quality mode and the set recording mode as mentioned above, the present invention should not be construed as being limited thereto and dark and light coloring of the icons, letters, and symbols displayed on the display device 13 may be switched as shown in each of FIGS. 5B to 5G.

Further, when any one of the modes "BACKUP RECORDING", "DIVISIONAL RECORDING", and "SEQUENTIAL RECORDING" is set from among the above-mentioned recording modes, two recording media are always required. Therefore, while some one of the recording modes is set but only one recording medium is loaded in the recording medium loading unit 11, the CPU 12 may be configured to provide a warning to the user by blinking the icon that corresponds to the recording medium that is not loaded in the recording medium loading unit 11. That is, the CPU 12 provides a warning to the user when it detects that a recording medium to be inserted (loaded) in the recording medium loading unit 11 is not loaded. For example, when only the recording medium 11b is loaded in the recording medium loading unit 11 in spite of the fact that two recording media are required, the icon 5b is blinked to warn the user.

Similarly, when no recording media are loaded in spite of the set recording mode, both the icons 5a and 5b may be blinked to perform warning, thereby prompting the user to load a recording medium or recording media required. Although explanation has been made herein on the example in which the icon or icons are blinked to warn the user, warning may be provided by other methods, for example, by displaying a message on the image-displaying device 9 or the display device 13 or by outputting voice guidance.

Further, when the recording mode is set to "DIVISIONAL RECORDING", a RAW image data is recorded in one of the recording media and a JPEG image data is recorded in the other of the recording media. On this occasion, a JPEG image data has a data size per image greater than a RAW image data. For this reason, when the capacity for recording of the recording medium 11a differs from that of the recording medium 11b, the CPU 12 preferably controls the units to determine the destination of recording of an image such that a RAW image data is recorded in the recording medium having a greater capacity for recording and a JPEG image data is recorded in the recording medium having a smaller capacity for recording. Here, the capacity for recording in a recording medium may be the total capacity or remaining capacity (free space capacity) of the recording medium. In addition, the CPU 12 may be configured to control the units to determine the destination of recording of an image data such that a RAW image is recorded in the recording medium 11a and a JPEG image in the recording medium 11b regardless of the capacity for recording of the recording medium.

Note that the destination of recording of the image data determined upon the determination of the recording mode is not changed until the recording mode is changed next or until the recording mode is reset to the divisional recording. On the other hand, when the recording medium is replaced by another recording medium, the destination of recording of the image data may be set again depending on the remaining memory size of the loaded recording medium after the replacement. In case where the remaining memory size of either one of the recording medium is reduced and recording of an image in the recording medium concerned in the set image quality mode is judged to be impossible, it may be also acceptable that the remaining capacity for recording of the recording medium at that point in time is judged and the destination of recording of the image is reset again.

Figure 6:
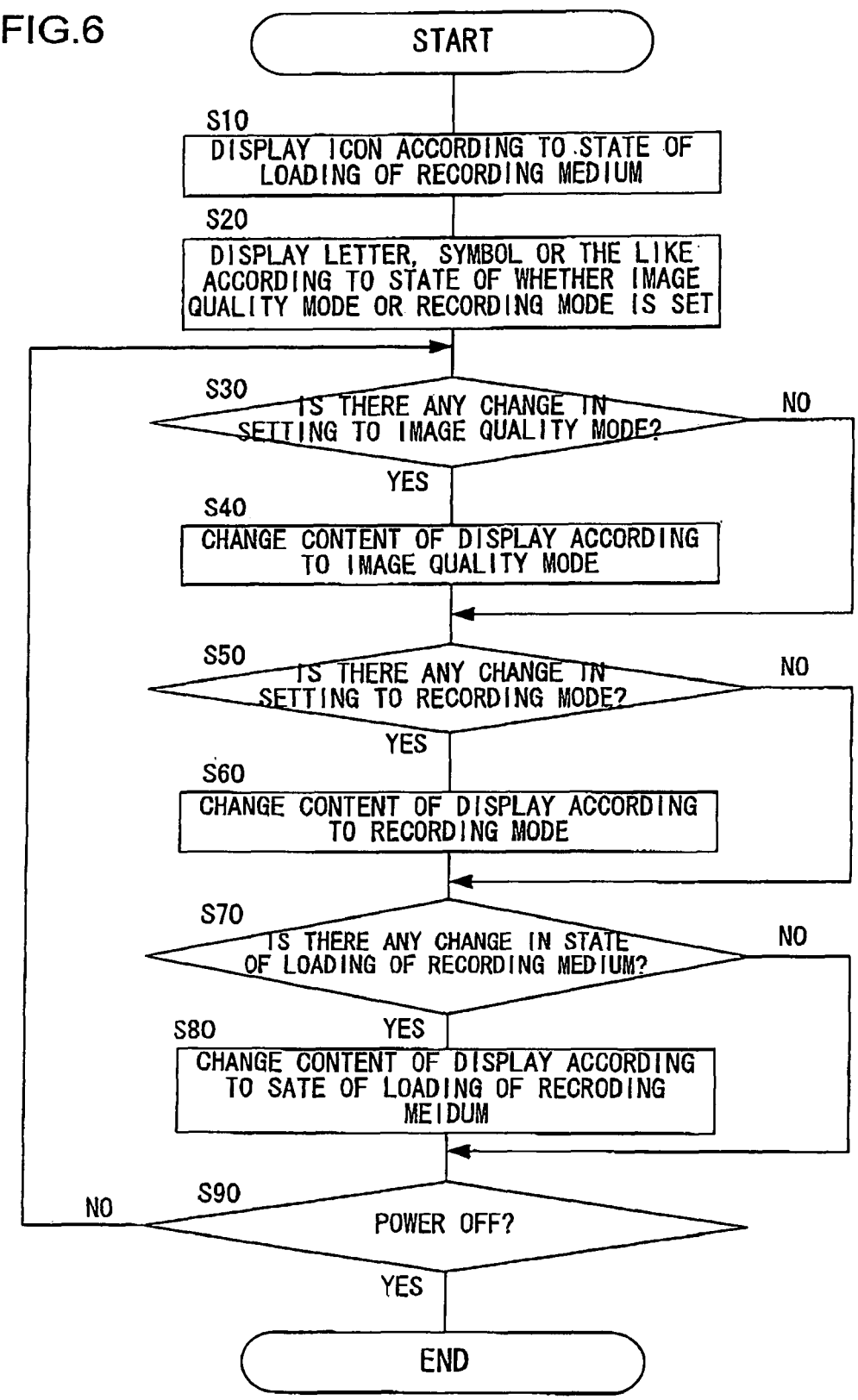
FIG. 6 is a flow chart illustrating the flow of processing by a camera according to an embodiment of the present invention.

FIG. 6 is a flowchart illustrating the processing of the camera 100 according to the present embodiment. The processing shown by FIG. 6 is executed by the CPU 12 as a program that is started up when the power of the camera 100 is turned on.

In a step S10, the CPU 12 detects the sate of loading of recording media in the recording medium loading unit 11 and displays the above-mentioned icons on the display device 13 based on the result of the detection. That is, if the recording medium 11a is loaded, the icon 5a is displayed while if the recording medium 11b is loaded, the icon 5b is displayed. Then, the flow of control proceeds to a step S20.

In the step S20, the CPU detects the state of settings of image quality mode and of recording mode upon activation (power on) and displays letters in an icon and a symbol between icons as shown in FIGS. 5A to 5G based on the result of the detection. Then, the flow of control proceeds to a step S30, in which it is judged whether or not the setting of image quality mode is changed by the user on the image quality mode selection screen as shown in FIG. 3. If the result of the judgment is NO, the flow of control proceeds to a step S50 detailed below. On the contrary, if the result of the judgment is YES, the flow of control proceeds to a step s40 to change the content of display on the display device 13 depending on the changed image quality. That is, the display or non-display of letters to be displayed in icons is switched. Then, the flow of control proceeds to the step S50.

In the step S50, the user judges whether or not the setting of recording mode is changed on the recording mode selection screen as shown in FIG. 4. If the result of the judgment is NO, the flow of control proceeds to a step S60 detailed below. On the contrary, if the result of the judgment is YES, the flow of control proceeds to a step S60 to change the content of display on the display device 13 depending on the changed recording mode. That is, the display or non-display of letters to be displayed in icons and/or symbols between icons is switched. Then, the flow of control proceeds to a step S70.

In the step S70, it is judged whether or not the state of loading of recording media in the recording medium loading unit 11 is changed. If the result of the judgment is NO, the flow of control proceeds to a step S90 detailed below. On the contrary, if the result of the judgment is YES, the flow of control proceeds to a step S80 to change the content of display on the display device 13 depending on the changed state of loading of the recording media. That is, the display or non-display of the icons 5a and 5b icons is switched. Then, the flow of control proceeds to the step S90, in which it is judged whether or not the power of the camera 100 is turned off by the user. If the result of the judgment is NO, the flow of control returns to the step S30 to repeat the processing. On the other hand, if the result of the judgment is YES, the flow of control of this routine terminates.

According to the above-mentioned embodiment, the following advantages are obtained.

(1) Icons indicating the state of loading of recording media in the recording medium loading unit 11 are displayed on the display device 13, so that information on recording of an image data in the recording media, that is, information on the image quality of an image corresponding to the image data to be recorded in the recording media can be displayed in or near the icons. This enables the user to easily grasp the image quality of the image corresponding to the image data to be recorded in the recording media.

(2) The recording medium loading unit 11 is adapted to load a plurality of recording media, e.g., recording media 11a and 11b and the display device 13 is controlled to display icons of respective recording media in order to display the state of loading of the respective recording media. This makes it possible for a user of a camera capable of recording images in a plurality of recording media to easily grasp information on the state of loading of recording media or the image quality of image for each recording medium.

(3) The display device 13 is controlled to display symbols "→" and "+" representing the state of recording mode between icons of the respective recording media. This enables the user to easily grasp the mode in which the image data is recorded in the recording medium.

(4) If it is detected that among a plurality of recording media, one recording medium that is supposed to be loaded in the recording medium loading unit 11 is not actually loaded, the user is given a warning to that effect. This enables the user to easily know that the necessary recording medium has not been loaded.

(5) A plurality of recording media are each determined for the total capacity for recording or remaining capacity for recording thereof to decide which one of the recording media is to be used to record an image. This makes it possible to use the recording media efficiently, for example, by making a decision such that when the recording mode is set to "DIVISIONAL RECORDING", a RAW image data, which has a relatively large data size, is recorded in the recording medium having a larger capacity for recording and a JPEG image data, which has a relatively small data size, is recorded in the recording medium having a smaller capacity for recording.

—Variation—

Note that the camera according to the above-mentioned embodiment may be modified as follows.

(1) In the above-mentioned embodiment, explanation has been made on the example in which the recording medium loading unit 11 can load two recording media 11a and 11b. However, the present invention is also applicable to a camera that includes the recording medium loading unit 11 provided with three or more slot units to enable loading of three or more recording media. In this case, it is only necessary that the display device 13 is adapted to display thereon a plurality of icons the number of which corresponds to the number of the recording media that can be loaded in the recording medium loading unit 11, information on image quality mode in each icon, and information on the recording mode between the icons.

(2) In the above-mentioned embodiment, explanation has been made on the example in which an icon that indicates the state of loading of recording media in the recording medium loading unit 11 is displayed on the display device 13 and information on the image quality of an image to be recorded in the recording media is displayed in or near the icons as information on the recording of the image data in the recording media. However, other information on the recording of the image data in the recording media, for example, the number of frames of image that can be recorded in the recording medium, the free space capacity of the recording medium, and the number of frames of image already recorded may be displayed.

(3) In the above-mentioned embodiment, explanation has been made on the example in which when only one recording medium is loaded in the recording medium loading unit 11 although two recording media are required, a warning by blinking the icons is given to the user. However, when only one recording medium is loaded in the recording medium loading unit 11 although two recording media are required, it would also be acceptable to record image data in the single recording medium that is loaded while maintaining the characteristics of the set recording mode.

For example, in the case where both the recording media 11a and 11b are loaded in the recording medium loading unit 11 when the "RAW+FINE" is selected as the image quality mode and "DIVISIONAL RECORDING" is selected as the recording mode the display on the display device 13 is made as shown in FIG. 5F and a RAW image data is recorded in the recording medium 11a and a FINE of JPEG image data is recorded in the recording medium 11b. On the contrary, in the case where only the recording medium 11a is loaded, the display on the display device 13 is made as shown in FIG. 5D and a RAW image data and a FINE of JPEG image data are recorded in the recording medium 11a. This makes it possible to perform recording of image data while maintaining the characteristics of the recording mode as far as at least one recording medium is loaded in the recording medium loading unit.

(4) In the above-mentioned embodiment, explanation has been made on the example in which the present invention is applied to a camera that is capable of loading a plurality of recording media and the state of loading of the recording media can be displayed on the display device 13. However, the present invention should not construed as being limited thereto and the present invention is also applicable to other electronic apparatus that allows loading of a plurality of recording media and includes a display device that can display the state of their loading, for example, a cellular phone or a portable audio and video player.

(5) In the above-mentioned embodiment, explanation has been made on the example in which the camera includes two display devices, i.e., the image-displaying device 9 displaying thereon images and various types of menu screens and the display device 13 displaying thereon icons indicating the state of loading of recording media and letters or symbols indicating the image quality and the method of recording images. However, when the camera 100 includes only one display device, the contents of displays that are otherwise to be displayed on the image-displaying device 9 and the display device 13 may be displayed on the single display device.

(6) In the above-mentioned embodiment, explanation has been made on the example in which the icons 5a and 5b are each constituted by figures that stand for a memory card stipulated by the CIPA standard. However, other figures, for example, those icons that are constituted by a simple square, rectangles and the like may be used.

The above described embodiments are examples, and various modifications ca be made without departing from the scope of the invention.

What is claimed is:

1. A camera comprising:
an image-capturing unit that captures an image of a subject;
a generating unit that generates an image data based on the captured image;
a loading unit capable of loading a plurality of recording media for recording the image data generated by the generating unit;
a recording control unit that records the generated image data in one or more of the recording media loaded in the loading unit; and
a warning unit that gives a warning if, out of the plurality of recording media, a recording medium that is supposed to be loaded, based upon a relationship on recording between the plurality of recording media, is not loaded in the loading unit.

2. A camera according to claim 1, further comprising:
a detection unit that detects a state of loading of the recording medium in the loading unit; and
a display control unit that displays one or more icons that indicate the state of loading of the recording medium and information on the recording medium in association with the icon on a display device, wherein:
the loading unit is provided with a plurality of slots that are each capable of loading one of the plurality of recording media;
the detection unit detects the state of loading of the recording medium for each of the plurality of slots; and
the display control unit displays the detected state of loading of the recording medium for each of the plurality of slots with the icons.

3. A camera according to claim 2, wherein:
when displaying the icons for the plurality of recording media, the display control unit displays, between the icons, information indicating a relationship on recording between the plurality of recording media.

4. A camera according to claim 2, wherein:
the recording control unit determines which of the plurality of recording media the image data is to be recorded on based on a total recording capacity or a remaining recording capacity of each of the plurality of recording media.

5. A camera comprising:
an image-capturing unit that captures an image of a subject;
a generating unit that generates an image data based on the captured image;
a loading unit capable of loading a plurality of recording media for recording the image data generated by the generating unit; and
a recording control unit that records the generated image data in one or more of the plurality of recording media loaded in the loading unit,
wherein, if out of the plurality of recording media, a recording medium that is supposed to be loaded, based on a relationship on recording between the plurality of recording media, is not loaded in the loading device, an image data of an image to be recorded in the recording medium that is not loaded, is recorded in a recording medium that is loaded in the loading unit.

6. A camera according to claim 5, further comprising:
a detection unit that detects a state of loading of the recording medium in the loading unit; and
a display control unit that displays one or more icons that indicate the state of loading of the recording medium and information on the recording medium in association with the icons on a display device, wherein:
the loading unit is provided with a plurality of slots that are each capable of loading one of the plurality of recording media;
the detection unit detects the state of loading of the recording medium for each of the plurality of slots; and
the display control unit displays the detected state of loading of the recording medium for each of the plurality of slots with an icon.

7. A camera according to claim 6, wherein:
when displaying the icons for the plurality of recording media, the display control unit displays, between the icons, information indicating a relationship on recording between the plurality of recording media.

8. A camera according to claim 6, wherein:
the recording control unit determines which of the plurality of recording media the image data is to be recorded based on a total recording capacity or a remaining recording capacity of each of the plurality of recording media.

9. A camera comprising:
an image capturing unit that captures an image of a subject;
a generating unit that generates an image data based on the captured image;
a loading unit capable of loading a plurality of recording media that record image data generated from the image captured by the image capturing unit;
a recording control unit that records the generated image data while a recording medium of the plurality of recording media is being loaded in the loading unit;
a detection unit that detects respective states of loading of the plurality of recording media in the loading unit; and
a display control unit that displays, on a display device, icons indicating the respective states of loading of the plurality of recording media and also displays, between the icons, information indicating a relationship on recording between the plurality of recording media.

10. A camera comprising:
an image-capturing unit that captures an image of a subject;
a generating unit that generates an image data based on the captured image;
a loading unit capable of loading a plurality of recording media for recording the image data generated by the generating unit; and
a recording control unit that records, based on a relationship on recording between the plurality of recording media, the generated image data in one or more of the plurality of recording media loaded in the loading unit, wherein:
the relationship on recording between the plurality of recording media is a relationship on any one of the following recording modes (a) to (c) that are preset upon photographing:
(a) a sequential recording mode in which when it becomes impossible to record the image data in one of at least two recording media, the image data is recorded in another of the at least two recording media;
(b) a backup recording mode in which the image data is recorded in each of the at least two recording media; and
(c) a divisional recording mode in which at least two image data are generated by at least two image processing methods that are different from each other and the image data generated by one of the image processing methods is recorded in one recording medium and the image data generated by another of the image processing methods is recorded in another recording medium.

11. A camera according to claim 10, further comprising:
a detection unit that detects a state of loading of a recording medium of the plurality of recording media in the loading unit;
a display control unit that displays one or more icons that indicate the state of loading of the recording medium and information on the recording medium in association with the icon on a display device, wherein:
the loading unit is provided with a plurality of slots that are each capable of loading one of the plurality of recording media;
the detection unit detects the state of loading of the recording medium for each of the plurality of slots; and
the display control unit displays the detected state of loading of the recording medium for each of the plurality of slots with the icons.

12. A camera according to claim 11, further comprising:
a warning unit that gives a warning to a user, wherein
when any one of the sequential recording mode, the backup recording mode, and the divisional recording mode is selected, and if it is detected that only one of the recording media is loaded in the loading unit, the warning unit informs the user of shortage of a recording medium or recording media.

13. A camera according to claim 11, wherein:
when any one of the sequential recording mode, the backup recording mode, and the divisional recording mode is selected, and if it is detected that only one of the recording media is loaded in the loading unit, a plurality of image data corresponding to image signals obtained upon capturing the image in any one of the backup recording mode and the divisional recording mode are recorded in the only one of the recording media.

14. A camera according to claim 11, further comprising:
a judgment unit that judges which one of the backup recording mode and the divisional recording mode is selected; and
a calculation unit that calculates remaining capacities of the at least two recording media, respectively, wherein
when the judgment unit judges that any one of the backup recording mode and the divisional recording mode is selected, the recording control unit records an image data having a larger amount of data in a recording medium having a larger remaining capacity calculated by the calculation unit.

15. A camera according to claim 11, further comprising:
a decision unit that decides which one of the at least two image data is to be recorded in which one of the at least two recording media, wherein
when setting of the recording mode is changed or when the recording mode is reset to the divisional recording mode, the decision unit decides again which one of the at least two image data is to be recorded in which one of the at least two recording media.

16. A camera according to claim 11, further comprising:
an exchange detection unit that detects an exchange of the recording media,
a decision unit that decides which one of the at least two image data is to be recorded in which one of the at least two recording media, wherein
the decision unit decides again which one of the at least two image data is to be recorded in which one of the at least two recording media based on a remaining capacity of the recording medium after the exchange detected by the exchange unit.

17. A camera according to claim 11, further comprising:
a decision unit that decides which one of the at least two image data is to be recorded in which one of the at least two recording media;
a calculation unit that calculates remaining capacities of the at least two recording media, respectively; and
a recording judgment unit that judges whether it is impossible to record the image data in any one of the at least two recording media in a set recording mode based on the remaining capacity calculated by the calculation unit due to a decrease in the remaining capacity of the recording medium concerned, wherein
the decision unit decides again which one of the at least two image data is to be recorded in which one of the at least two recording media based on the remaining capacity of the recording medium calculated by the calculation unit at a time in point when the recording judgment unit performs the judgment.

18. A camera according to claim 11, wherein:
when the sequential recording mode is selected, the display control unit displays, between the icons, an arrow extending from one of the icons that represents a recording medium in which the image data is first recorded to another icon that represents a recording medium is recorded next, whereas when one of the backup recording mode and the divisional recording mode is selected, the display control unit displays, between the icons, a mark that indicates that the image data generated from a same image are recorded in the at least two recording media, respectively.

* * * * *